No. 832,088. PATENTED OCT. 2, 1906.
F. H. SEELEY.
DOUBLE ROW COTTON PLANTER.
APPLICATION FILED AUG. 9, 1905.

2 SHEETS—SHEET 1.

Witnesses.
B. M. Offutt.
E. B. McBath.

Inventor
Freeman H. Seeley,
by Brock
Attorneys

No. 832,088. PATENTED OCT. 2, 1906.
F. H. SEELEY.
DOUBLE ROW COTTON PLANTER.
APPLICATION FILED AUG. 9, 1905.

2 SHEETS—SHEET 2.

Witnesses
B. M. Offutt
E. B. McBath

Inventor
Freeman H. Seeley
by Osman & Brock
Attorneys

UNITED STATES PATENT OFFICE.

FREEMAN HALL SEELEY, OF JACKS CREEK, TENNESSEE, ASSIGNOR OF ONE-HALF TO WILLIAM H. MORGAN, OF FINGER, TENNESSEE.

DOUBLE-ROW COTTON-PLANTER.

No. 832,088.     Specification of Letters Patent.     Patented Oct. 2, 1906.

Application filed August 9, 1905. Serial No. 273,400.

*To all whom it may concern:*

Be it known that I, FREEMAN HALL SEELEY, a citizen of the United States, residing at Jacks Creek, in the county of Chester and State of Tennessee, have invented a new and useful Improvement in Double-Row Cotton-Planters, of which the following is a specification.

This invention relates to a double-row cotton-planter, and has for its object a planter comprising an adjustable frame adapted to be varied so that the hoppers and cultivators can be brought into alinement with rows of varying distances apart.

The invention consists of the novel features of construction hereinafter fully described, pointed out in the claims, and shown in the accompanying drawings, in which—

Figure 1:
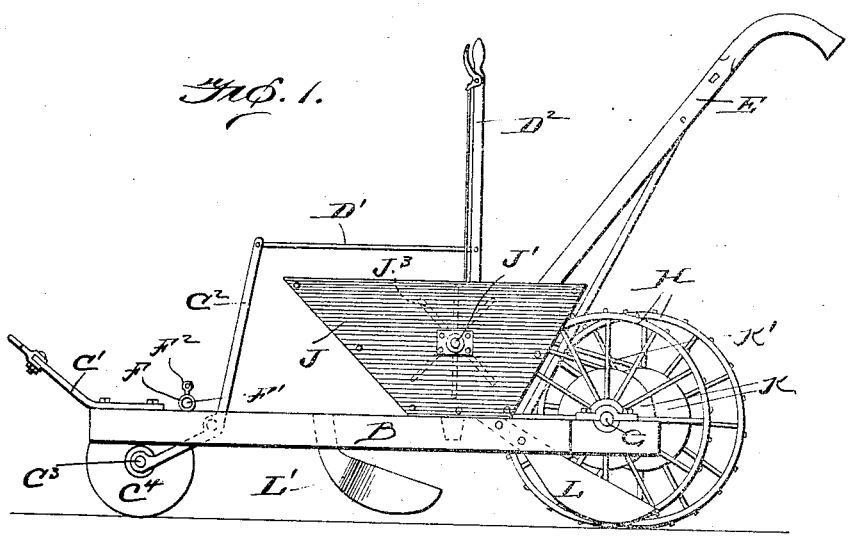
Figure 2:
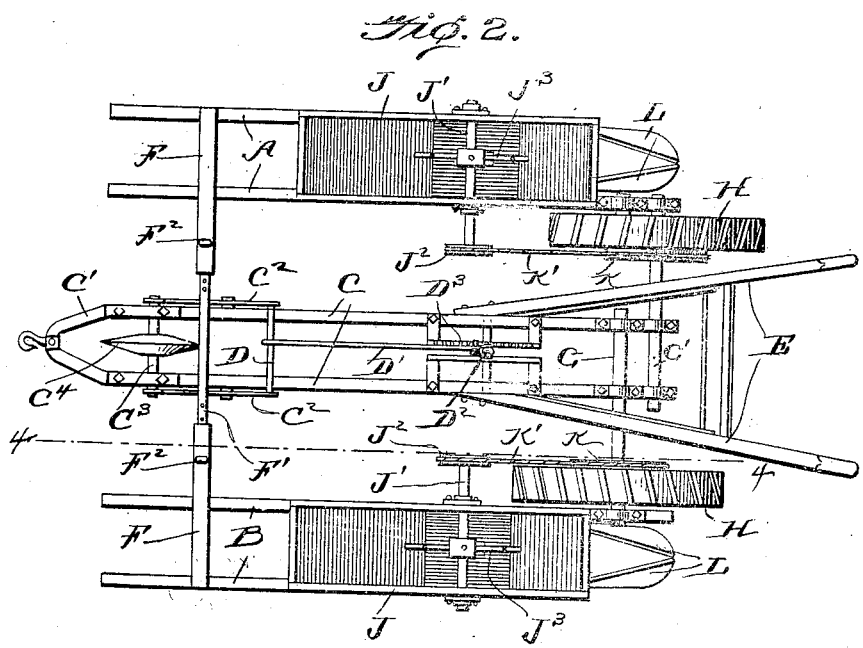
Figure 3:
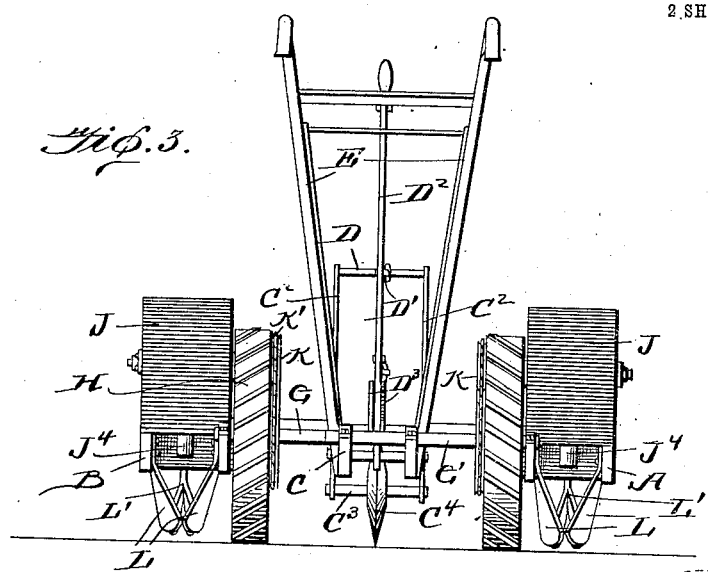
Figure 4:
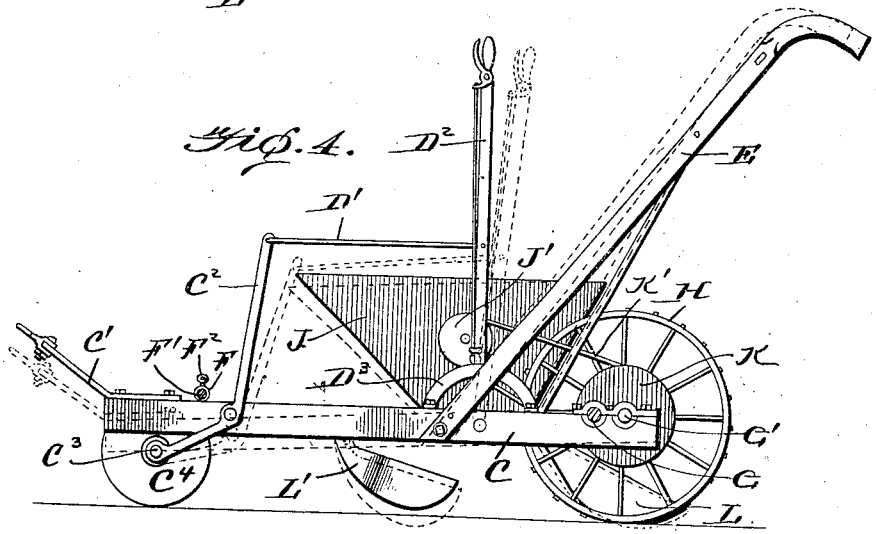
Figure 5:
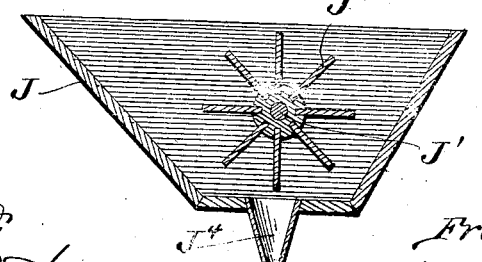

Figure 1 is a side elevation of the device. Fig. 2 is a plan view. Fig. 3 is a rear end elevation. Fig. 4 is a section on the line 4 4 of Fig. 2, and Fig. 5 is a longitudinal section through a hopper.

The planter consists of three frames A, B, and C, the latter being between the frames A and B. Each of these frames preferably consists of two parallel members, and the members constituting the frame C are connected at their forward ends by an angled yoke C'. Angled levers $C^2$ are pivoted to the sides of the members composing the frame C, and at their lower ends and below the frame C the levers $C^2$ are connected by or carry a shaft $C^3$, upon which is mounted a disk $C^4$, which rests upon the ground and supports the forward portion of the device. Adjacent their upper ends the levers $C^2$ are connected by a bar D, to which is pivoted a link D', pivoted in turn at its rear end to an upright lever $D^2$, which works in the usual manner over a segment $D^3$, the lower end of the lever $D^2$ being pivotally carried by the frame C. Handles E are also supported by the rear end portion of the frame C. Adjacent their forward ends the frames A and B carry alining tubes F, and a connecting-rod F' slides in these tubes and is locked in position by means of set-screws $F^2$. The rod F passes above the frame C and is not connected to the said frame.

At the rear of the device a shaft G is journaled at one end in the frame B, and its inner end portion is slidably journaled in bearings carried by the parallel members of the frame C, and intermediate to the rear of the shaft G the shaft G' has its outer end journaled in a bearing carried by the frame A, and its inner portion is journaled in bearings carried by the frame C, the two shafts sliding in the bearings carried by the frame C and having their inner end portions overlapping. On the shafts G and G' adjacent the frames B and A, respectively, are mounted drive-wheels H, which support the rear end of the device. On the frames A and B are mounted hoppers J, having each a transverse shaft J', and on the shafts within the hoppers are mounted agitator-fingers $J^3$, and on the inner ends of the shaft J', but without the hoppers, is mounted a pulley $J^2$. The shafts G and G' carry each a pulley K in alinement with one of the pulleys $J^2$, and belts or cables K' pass over the alining pulleys K and $J^2$. It will be obvious that sprocket wheels and chains can be used in place of pulleys and cables. A discharge-spout $J^4$ is carried by each hopper, and, if desired, any of the many forms of device for controlling the discharge of the seed can be employed.

The frames A and B are each provided with two sets of cultivator plates or shovels, the forward sets L' opening the furrows and the rear sets L closing or covering the furrows. The frames A and B can be moved toward and away from each other by loosening the set-screws $F^2$, the rod F' moving in the tubes F and the shafts G and G' sliding in the bearings carried by the frame C, or either of the frames A or B may be moved so as to change its distance from the frame C without moving the other adjustable frame. While the frames A and B are movable toward and away from the frame C, the frame C is also vertically adjustable by means of the lever $D^2$, link D', and the levers $C^2$. By throwing the lever $D^2$ rearwardly into the position shown in dotted lines in Fig. 4 the frame C will be permitted to drop in the position shown in dotted lines in said figure, and as the connecting-rod F' supports the front frames A and B by resting upon the frame C the forward portion of the frames A and B will also be lowered to the same extent that the forward end of the frame C is lowered. It will thus be seen that the frames A and B are adjustable with respect to each other, with respect to the frame C, and also with reference to the elevation of their forward ends above the ground.

Having thus fully described my invention, what I claim as new, and desire to secure by Letters Patent, is—

1. A device of the kind described comprising a central frame, outer parallel frames, shafts journaled at their outer ends, in the outer frames, respectively, and having their inner end portions slidably journaled in the center frame, alining tubes carried by the forward end portions, of the outer frames, a rod sliding in said tubes, and adapted to bear upon the center frame, and means for raising and lowering the center frame.

2. A device of the kind described comprising a center frame, said frame comprising two parallel members, parallel levers angled and pivoted to the members of said frame, a shaft carried by the said levers, below the frame, a disk mounted on a shaft, adapted to travel upon the ground, a lever working upon a segment, means for transmitting movement of the last-mentioned lever to the lever pivoted to the said frame, outer frames parallel to the said center frame and adjustable toward and away from the said center frame, and feed-hoppers carried by the outer frames.

3. A device of the kind described comprising center and outer frames, feed-hoppers carried by the outer frames, shafts journaled respectively at their outer ends in the said outer frames, and having their inner end portions slidably journaled in bearings carried by the center frame, a telescopic connection between the said outer frames, adjacent their forward portions, said connection bearing upon the center frame, angled levers pivoted to the sides of the center frame, a shaft carried by said levers below the center frame, a disk on the said shaft adapted to bear upon the ground, and means for moving the said levers, as and for the purpose set forth.

FREEMAN HALL SEELEY.

Witnesses:
J. A. WARD,
A. G. SEWELL.